Patented Mar. 2, 1954

2,671,071

UNITED STATES PATENT OFFICE 2,671,071

POLYAMIDES OF DIALKYL DICARBOXYL-
ATES AND 2,6-DIAMINOPYRIDINE, AND
QUATERNARY SALTS THEREOF

Thomas T. M. Laakso and Delbert D. Reynolds, Rochester, N. Y., assignors to Eastman Kodak Company, Rochester, N. Y., a corporation of New Jersey No Drawing. Application February 12, 1952,
Serial No. 271,286

13 Claims. (Cl. 260—78)

This invention relates to resinous polyamides of dialkyl dicarboxylates and 2,6-diaminopyridine, to quaternary ammonium salts thereof, and to the preparation of the same.

Resinous compositions containing nitrogen heterocyclic nuclei are known to act as mordants for acids, particularly in color processes wherein acid dyes are employed. However, the utility of many such known compositions as mordants is quite limited. For example, linear polyamides prepared by condensing bis keta ketonic carboxylic acid dialkyl esters such as, for example, ethyl ester of acetone dicarboxylic acid, with a diaminopyridine are known to be excellent dye intermediates, and in photographic processes their alkali-metal salts have been shown to function as good color formers. However, they are relatively poor mordanting agents and the presence of an enolizable methylene group interferes with their use in certain color processes where a stable, powerful mordant is required for fixing acid dyes.

We have now found that superior precipitants and mordants for acid dyes, particularly suitable for fixing acid dyes in photographic layers, are obtained by condensing certain dialkyl dicarboxylates, which contain no enolizable methylene group, with 2,6-diaminopyridine, under conditions which result in resinous, high molecular weight polyamide products. We have found further that our new polyamide resins are readily convertible to quaternary salts, and in this form function even better as mordanting agents. While the basic polyamides of our invention are insoluble in water, but soluble in some organic solvents such as methanol and in dilute aqueous mineral and organic acids, the quaternary salts are in addition partially soluble in pure water. The amount of acid used can be sufficient to just dissolve the resin, although higher concentrations than that can be employed, if desired. The new polyamides and their quaternary salts readily form substantially water-insoluble salts with water-soluble acid dyes. They are also compatible with various colloidal materials such as gelatin. These properties, together with their relatively large molecular dimensions make our new polyamides and quaternary salts thereof outstanding mordants for fixing soluble acid dyes such as those employed in photographic layers. They are particularly valuable as mordants in preventing diffusion of the dyes when incorporated in the form of their dilute acetic acid solutions in light filter layers, in backing layers designed to prevent back reflection from the film support, etc., in light-sensitive photographic materials. They are also valuable as components in imbibition printing blanks, where the process involves dye transfer from a tanned gelatin relief to the gelatin-mordant composition coated cellulose ester or synthetic resin sheet or film, paper, glass or similar support. Other colloids such as polyvinyl alcohol or partially hydrolyzed polyvinyl acetate can be employed in place of gelatin. Also, other materials can be added to the composition of gelatin-dye-mordant such as silver halide dispersed therein so that there is obtained a material which functions both as a light-sensitive photographic element and as an imbibition blank.

It is, accordingly, an object of our invention to provide a new class of polyamide resins and quaternary salts thereof. Another object is to provide polyamide resins and quaternary salts thereof which are excellent mordants for acid dyes in certain color processes. Another object is to provide methods for preparing the polyamide resins and quaternary salts of the invention. Other objects will become apparent hereinafter.

In accordance with the invention, we prepare our new polyamide resins and quaternary salts thereof by heating one or more dialkyl dicarboxylates selected from the group consisting of esters having the general formula:

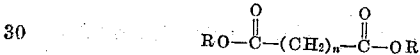

and

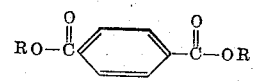

wherein $n$ represents a whole number from 2 to 8 and R represents an alkyl group containing from 1 to 4 carbon atoms (e. g. methyl, ethyl, propyl, isopropyl, butyl, etc., groups), and 2,6-diaminopyridine, in the proportions of approximately a mole of carboxylate compound to each mole of 2,6-diaminopyridine, at a temperature of from 175° to 250° C., until the condensation reaction is substantially complete, and isolating the polymeric product by extraction methods, washing, etc., then converting the product to a quaternary salt by heating it with an equivalent amount, or more, of an alkyl halide, a dialkyl sulfate or an alkyl arylsulfonate, at a temperature of about 100° C., until the quaternization reaction is complete, and then purifying the quaternary salt obtained, for example, by repeated extractions with a non-solvent such as diethyl ether and drying the product. No cyclization was observed to take place under the conditions of the reaction. Suitable dialkyl carboxylates include dimethyl succinate, diethyl succinate, dipropyl succinate, diisopropyl succinate, dibutyl succinate, disecondary butyl succinate and corresponding dialkyl esters of glutaric, adipic, pimelic, suberic, azelaic, sebacic and terephthalic acids. In contradistinction to the above, dialkyl esters of oxalic acid under similar reaction conditions with 2,6-diaminopyridine give insoluble polymers, i. e., insoluble in dilute aqueous acid solutions, which are not readily adaptable for use as mordanting agents.

The products obtained as described above and in the examples which follow are resinous, linear polyamides containing in the case of the aliphatic dicarboxylate reaction products with 2,6-diaminopyridine, in the form of the free base the recurring structural unit of the formula:

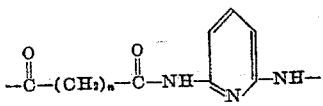

wherein $n$ has the above defined meaning, and containing in the case of the terephthalates reaction products with 2,6-diaminopyridine, in the form of the free base, the recurring structural unit of the formula:

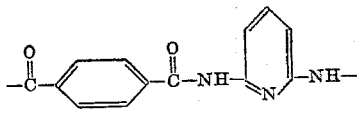

and in the quaternized salt forms the recurring structural units of the formulas:

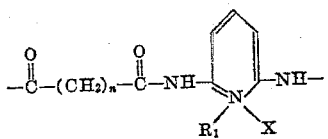

and

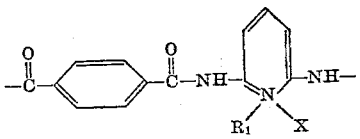

wherein $n$ has the previous definition and $R_1$ represents an alkyl group containing from 1 to 4 carbon atoms (e. g. methyl, ethyl, n-propyl, n-butyl, isobutyl, etc. groups), but preferably primary alkyl groups of 1 to 4 carbon atoms, and X represents an arylsulfonic acid radical (i. e. and arylsulfonate anion containing from 6 to 7 carbon atoms) e. g. a benzenesulfonate anion, a p-toluenesulfonate anion, etc., an alkylsulfuric acid radical (i. e. an alkylsulfate anion containing from 1 to 4 carbon atoms), e. g. methylsulfate, ethylsulfate, n-propylsulfate, n-butylsulfate, etc., and a halide anion e. g. chloride anion, bromide anion and an iodide anion, or other acid radical (anion). Suitable quaternizing agents include methyl benzensulfonate, ethyl benzenesulfonate, propyl benzensulfonate, butyl benzenesulfonate, methyl p-toluenesulfonate, ethyl-p-toluenesulfonate, propyl-p-toluenesulfonate, butyl-p-toluenesulfonate, etc., dimethyl sulfate, diethyl sulfate, dipropyl sulfate, dibutyl sulfate, etc., methyl bromide, ethyl bromide, propyl bromide, butyl bromide, etc., and the corresponding alkyl chlorides and iodides, and the like.

The following examples will serve to illustrate further our new class of polyamide polymers, quaternary ammonium salts thereof, and the manner of their preparation.

Example 1

54.5 g. (0.5 mol) of 2,6-diaminopyridine and 101 g. (0.5 mol) of freshly distilled diethyl adipate were mixed together and heated under a nitrogen atmosphere for 5 days, at a temperature of approximately 200° C., in an electrically heated oil bath. The dark-brown viscous material obtained was poured while still molten into an enameled tray and allowed to cool. The brittle cake was broken up and extracted with acetone in a Soxhlet extraction apparatus until no further material dissolved. The residual light-tan powder was dried and analyzed. The results indicated that the product was a polyamide containing approximately equimolar amounts of the reactants.

| Analysis | Calculated, Percent | Found, Percent |
|---|---|---|
| Carbon | 60.4 | 59.2 |
| Hydrogen | 5.9 | 6.3 |
| Nitrogen | 19.2 | 18.2 |

The product was soluble in 1% aqueous hydrochloric acid.

Example 2

2 g. of the polyamide resin of Example 1 were heated for several days with 5 g. of methyl-p-toluenesulfonate at steam bath temperature. The solid reaction product was separated and extracted several times with ether and dried. Analysis gave by weight 9.2% nitrogen and 7.6% sulfur compared with the calculated theoretical of 10.3% nitrogen and 7.9% sulfur. The product was not completely soluble in water, but formed clear solutions on addition of a small amount of acetic acid.

Example 3

54.5 g. (0.5 mol) of 2,6-diaminopyridine and 87 g. (0.5 mol) of freshly distilled diethyl succinate were placed in a sealed tube under a nitrogen atmosphere and heated for 5 days, at a temperature of about 185° C., in an electrically heated oil bath. The dark-brown viscous material obtained was poured while molten into an enameled tray and allowed to cool. The brittle cake was broken up and extracted with acetone until no further material dissolved therefrom. The residual dark powder was dried and analysis indicated that it was a linear polyamide containing approximately equimolar quantities of the reactants.

| Analysis | Calculated, Percent | Found, Percent |
|---|---|---|
| Carbon | 56.5 | 56.7 |
| Hydrogen | 4.7 | 5.1 |
| Nitrogen | 16.7 | 20.7 |

The product was insoluble in water, but soluble in dilute aqueous hydrochloric acid.

Example 4

One gram of the polyamide prepared by the procedure of Example 3 was heated with 3 g. of methyl-p-toluenesulfonate for more than 24 hours at steam bath temperature. The product was analyzed after repeated extraction with ether and thorough drying. The analysis indicated that a high quality quaternary salt of the polyamide had been obtained.

| Analysis | Calculated, Percent | Found, Percent |
|---|---|---|
| Carbon | 54.1 | 52.6 |
| Hydrogen | 5.1 | 5.3 |
| Nitrogen | 11.1 | 9.3 |
| Sulfur | 8.5 | 10.1 |

*Example 5*

Equimolar quantities of 2,6-diaminopyridine and diethyl sebacate were heated together and the product purified following the procedure of Example 3, except that a Bunsen valve was used to seal the tube. Also the reaction temperature was raised slowly from 180° C. to 210° C. during the 5 day heating period. The product was found to be a linear polyamide containing approximately equimolar quantities of the reactants in the molecule.

| Analysis | Calculated, Percent | Found, Percent |
|---|---|---|
| Carbon | 65.5 | 64.6 |
| Hydrogen | 7.6 | 8.2 |
| Nitrogen | 15.2 | 14.1 |

The product was insoluble in water, but soluble in dilute aqueous hydrochloric acid.

*Example 6*

A quaternized salt of the polyamide of Example 5 was prepared with methyl-p-toluenesulfonate following the process described in the preceding quaternization examples. Analysis of the salt gave the following results:

| Analysis | Calculated, Percent | Found, Percent |
|---|---|---|
| Carbon | 58.0 | 54.3 |
| Hydrogen | 7.1 | 6.4 |
| Nitrogen | 9.6 | 10.3 |
| Sulfur | 7.3 | 9.0 |

The quaternized salt was partially soluble in water, but completely soluble in dilute aqueous acetic acid, hydrochloric acid, etc.

*Example 7*

36.3 g. (0.3 mol) of 2,6-diaminopyridine and 74 g. (0.3 mol) of freshly distilled diethyl terephthalate were heated together in an electrically heated oil bath, at 210°–220° C., for a period of 48 hours, in a flask sealed with a Bunsen valve. The solid reaction product was extracted with acetone in a Soxhlet extraction apparatus until no further material dissolved. The residual light-buff, colored powder was dried and analyzed. The results indicated that the product was a linear polyamide containing approximately equimolar proportions in the molecule of the reactants as indicated by the following results.

| Analysis | Calculated, Percent | Found, Percent |
|---|---|---|
| Carbon | 65.2 | 64.3 |
| Hydrogen | 3.7 | 4.5 |
| Nitrogen | 17.5 | 16.3 |

The product was insoluble in water, but soluble in dilute aqueous acids.

In contrast to the above, when equimolar quantities of 2,6-diaminopyridine and dimethylphthalate were reacted under similar conditions, no resinous polyamide was obtained, but only a crystalline product, apparently a diphthalimide corresponding to the following structural formula:

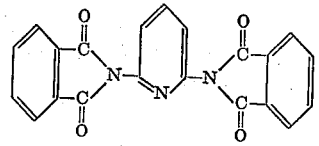

This product would not quaternize with either methyl-p-toluenesulfonate or n-butyl methanesulfonate.

*Example 8*

5 g. of the polyamide resin produced according to Example 7 were heated with 20.9 g. of methyl-p-toluenesulfonate on a steam bath for 48 hours. The product was analyzed after repeated extractions with ether and thorough drying. The quaternized product was found to contain by weight 59.3% carbon and 10.9% nitrogen compared with calculated theory of 59.2% carbon and 9.8% nitrogen.

Although the preceding quaternizing examples show the quaternization of the polyamides of our invention with only methyl-p-toluenesulfonate, it will be understood that equivalent amounts of the other mentioned quaternizing reagents can be substituted therefor to give the corresponding quaternary ammonium salts, which are equally useful as mordanting agents in various color processes. The quaternization reaction can also be carried out in the presence of an inert diluent such as, for example, methanol, ethanol, dioxane, etc., the resulting salt being isolated and purified by the usual methods employed in such processes.

What we claim is:

1. An alkyl quaternary salt of a resinous polymer selected from the group consisting of an alkyl quaternary salt of a linear polyamide consisting of recurring structural units of the formula:

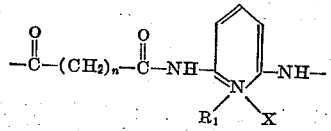

and an alkyl quaternary salt of a linear polyamide consisting of recurring structural units of the formula:

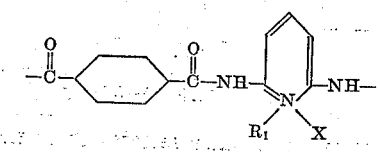

wherein $n$ represents a whole number of from 2 to 8, $R_1$ represents an alkyl group containing from 1 to 4 carbon atoms and $X$ represents an anion selected from the group consisting of arylsulfonate anions containing from 6 to 7 carbon atoms, alkylsulfate anions containing from 1 to 4 carbon atoms, a chloride anion, a bromide anion and an iodide anion.

2. An alkyl quaternary salt of a resinous, linear polyamide consisting of recurring structural units of the formula:

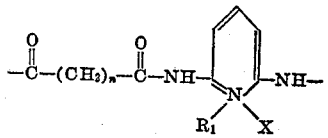

wherein n represents a whole number of from 2 to 8, $R_1$ represents an alkyl group containing from 1 to 4 carbon atoms and X represents an arylsulfonate anion containing from 6 to 7 carbon atoms.

3. An alkyl quaternary salt of a resinous, linear polyamide consisting of recurring structural units of the formula:

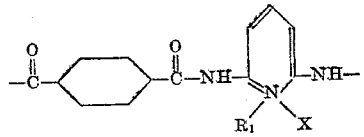

wherein $R_1$ represents an alkyl group containing from 1 to 4 carbon atoms and X represents an arylsulfonate anion containing from 6 to 7 carbon atoms.

4. An alkyl quaternary salt of a resinous, linear polyamide consisting of recurring structural units of the formula:

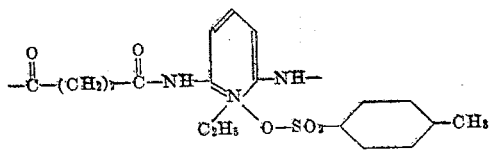

5. An alkyl quaternary salt of a resinous, linear polyamide consisting of recurring structural units of the formula:

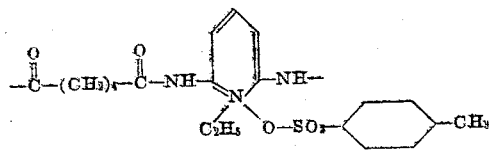

6. An alkyl quaternary salt of a resinous, linear polyamide consisting of recurring structural units of the formula:

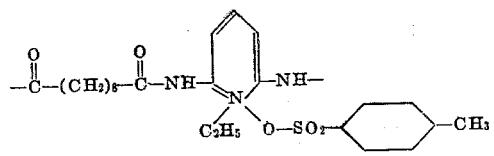

7. An alkyl quaternary salt of a resinous, linear polyamide consisting of recurring structural units of the formula:

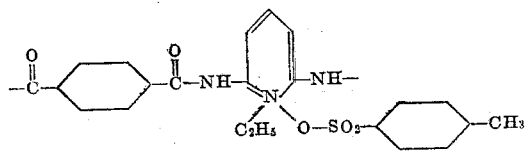

8. A resinous polymer selected from the group consisting of a linear polyamide consisting of recurring structural units of the formula:

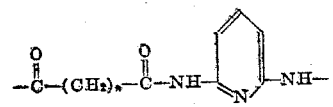

and a linear polyamide consisting of recurring structural units of the formula:

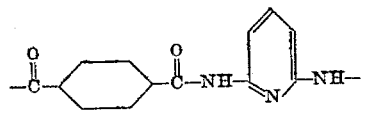

wherein n represents a whole number of from 2 to 8.

9. A resinous, linear polyamide consisting of recurring structural units of the formula:

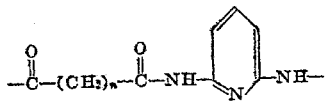

wherein n represents a whole number of from 2 to 8.

10. A resinous, linear polyamide consisting of recurring structural units of the formula:

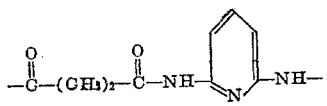

11. A resinous, linear polyamide consisting of recurring structural units of the formula:

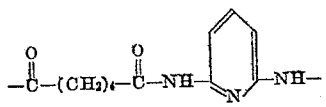

12. A resinous, linear polyamide consisting of recurring structural units of the formula:

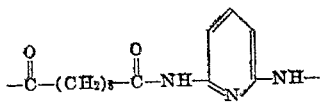

13. A resinous, linear polyamide consisting of recurring structural units of the formula:

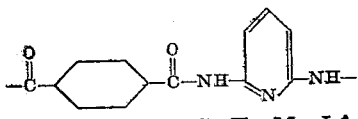

THOMAS T. M. LAAKSO.
DELBERT D. REYNOLDS.

References Cited in the file of this patent

UNITED STATES PATENTS

| Number | Name | Date |
|---|---|---|
| 2,274,831 | Hill | Mar. 3, 1942 |
| 2,396,275 | Kirby | Mar. 12, 1946 |
| 2,463,838 | Wilson | Mar. 8, 1949 |

FOREIGN PATENTS

| Number | Country | Date |
|---|---|---|
| 645,882 | Germany | June 4, 1937 |
| 704,288 | Germany | Mar. 27, 1941 |

OTHER REFERENCES

Diserens, The Chemical Technology of Dyeing and Printing, vol. II, Reinhold, 1951, pages 46, 52 and 336 to 338.